United States Patent Office 2,938,029
Patented May 24, 1960

2,938,029
ALPHA-OXIMINO-EPSILON CAPROLACTAM

Carl Max Brenner, Riehen, near Basel, and Hans Rudolf Rickenbacher, Basel, Switzerland, assignors to Geigy Chemical Corporation, Ardsley, N.Y., a corporation of Delaware No Drawing. Filed Jan. 23, 1959, Ser. No. 788,518

Claims priority, application Switzerland Jan. 31, 1958

1 Claim. (Cl. 260—239.3)

DL-lysine, a substance of use in supplementing the protein of wheat to make it correspond more closely in nutritive value to animal protein has so far been made from ε-caprolactam as starting material by converting the ε-caprolactam to ε-benzoylaminocaproic acid, brominating this acid, treating the ε-benzoylamino-α-bromocaproic acid so formed with ammonia and hydrolyzing the resulting ε-benzoylamino-α-aminocaproic acid (Org. Syn., Coll. Vol. 2, pp. 74, 76 and 374), or has been made from furfural via dihydropyran, δ-hydroxyvaleraldehyde, 5-(δ-hydroxybutyl) hydantoin and 5-(δ-chlorobutyl)hydantoin, U.S. Patent 2,498,300.

A suitable starting material for the preparation of DL-lysine and L-lysine would be α-amino-ε-caprolactam, since this substance very readily yields DL-lysine upon hydrolysis. It is more advantageous to use α-amino-ε-caprolactam for making DL-lysine than the other starting materials used to date, because α-amino-ε-caprolactam is readily purified by distillation or by the crystallization of one of its salts, for example, its hydrochloride, and because it can be hydrolyzed directly to DL-lysine alone without the concomitant unavoidable formation of by-products, such as benzoic acid. In spite of these favorable factors α-amino-ε-caprolactam has so far not been considered as a starting material for making DL-lysine because no suitable way for making this lactam was known. In addition, the art suggested that no suitable way of making α-amino-ε-caprolactam could be found, since the only method of making the α-amino-ε-caprolactam was from lysine itself and then it was not formed in high yield (D. W. Adamson, J. Chem. Soc., 1943, p. 39).

It has now surprisingly been found that α-oximino-ε-caprolactam can be prepared from α,α-dichloro-ε-caprolactam, which is readily made from ε-caprolactam by chlorination with phosphorus pentachloride (J. von Braun and A. Heymons, Berichte, 63, 502), and that α-oximino-ε-caprolactam can readily be converted into α-amino-ε-caprolactam by reduction. These findings make the hitherto unknown α-oximino-ε-caprolactam an extremely useful chemical for the production of α-amino-ε-caprolactam, the value of which for the preparation of lysine has been outlined above.

By our invention, α,α-dichloro-ε-caprolactam is caused to react with a hydroxylamine mineral acid salt, for example, the hydrochloride, sulfate or nitrate, in the presence of an alcohol, especially methanolic, ethanolic, propanolic or isopropanolic solution of ammonia or a low molecular-weight aliphatic amine such as, for example, methylamine. The use of ammonia is most preferred. It is most advantageous to use a solvent which has solvent power for all the components in the reaction such as, for example, a lower molecular-weight alcohol. The presence of appreciable amounts of water in the alcohol solvent is to be avoided since in some way it causes a decrease in the yield of product. A hydroxylamine salt is used for convenience, but in the basic solution it is acting as free hydroxylamine, so it will be obvious that free hydroxylamine can readily replace the salt. In order that the desired reaction of α,α-dichloro-ε-caprolactam to α-oximino-ε-caprolactam should not be of impractical length, raising the temperature approximately to the boiling point of the solvent is found to be of advantage.

The conversion of α-oximino-ε-caprolactam to α-amino-ε-caprolactam can be performed most advantageously by contacting the α-oximino-ε-caprolactam with hydrogen in the presence of a hydrogenation catalyst such as, for example, nickel and palladium. Increased pressure and elevated temperature are advantageously employed in the hydrogenation to increase the speed of the reaction, especially with nickel. During the hydrogenation the α-oximino-ε-caprolactam has to be in solution. Any solvent for α-oximino-ε-caprolactam which is resistant to attack by activated hydrogen and which, except for salt formation, does not react with the base produced may be used for this purpose. In particular, mixtures of alcohols or dioxan with water can be used, but most advantageous is the use of water, glacial acetic acid and mixtures of water with organic or strong mineral acids, such as acetic acid or hydrochloric acid. If the latter group of solvents is used, the hydrogenation proceeds very well, even at normal pressure and temperature. Of course, the use of nickel catalyst is not compatible with the use of an acidic solvent. In the conversion of α-oximino-ε-caprolactam to α-amino-ε-caprolactam one may use the crude oxime directly in solution or this oxime may be isolated and reduced. It is to be understood that α-amino-ε-caprolactam where referred to in this description of invention is racemic α-amino-ε-caprolactam.

The following examples are to illustrate the invention. Modifications may be made in carrying out the present invention without departing from the spirit and scope thereof and the invention is to be limited only by the appended claim.

EXAMPLE 1

(a) *Preparation of α-oximino-ε-caprolactam*

6 g. (=0.033 mol.) of α,α-dichloro-ε-caprolactam and 4.6 g. of hydroxylamine hydrochloride (0.066 mol.) are dissolved in 60 ml. of a 10% solution of ammonia in methanol. The solution is shaken for 14 hours at 60° C. in a closed vessel. After cooling, the ammonium chloride is filtered off and washed with cold methanol. The methanolic solution is evaporated in vacuo and the residue is extracted with water-saturated ethyl acetate. The ethyl acetate solution is evaporated to dryness and the residue is recrysallized from a mixture of methanol and ether, or from dioxan or from water. α-oximino-ε-caprolactam crystallizes in the form of white rhomboids, M.P. 206–208° C.; in a high vacuum it undergoes sublimation at about 140° C.

Analysis of the product shows it to contain: C, 50.72; H, 7.18; N, 19.86 (theory: C, 50.77; H, 7.09; N, 19.72). In the preparation of α-oximino-ε-caprolactam the solvent, methanol, may be replaced by an equal quantity of ethanol.

(b) *Reduction of α-oximino-ε-caprolactam*

142 mg. of α-oximino-ε-caprolactam are dissolved in 15 ml. of solvent (cf. table) and, after addition of 50 mg. of the catalyst (cf. table), the solution is shaken in an atmosphere of hydrogen until consumption of hydrogen ceases. The table illustrates the conditions and the result of each experiment.

TABLE

| Solvent | Catalyst | Consumption of hydrogen, percent | Time required, h. | Isolated product | Melting point, °C. | Yield, percent | Temperature and pressure |
|---|---|---|---|---|---|---|---|
| Methanol-water (1:1) | Raney nickel | 109.3 | 33 | Acetate | 168–172 | 53.3 | Ordinary. |
| Water | do | 122.7 | 24 | Base | 73–74 | 80.4 | Do. |
| Glacial acetic acid | Palladium on charcoal | 100 | 7 | Acetate | 176–178 | 92.2 | Do. |
| Acetic acid-water (9:1) | do | 100 | 20 | do | 176–178 | 93 | Do. |
| Water | do | 105.7 | 7 | Base | 73–74 | 95.6 | Do. |
| Ethanol-water (1:1) | do | 105 | 20 | Hydrochloride | 293–294 | 93 | Do. |
| Dioxan cont. 5% water | do | 76.5 | 30 | do | 290–292 | 31.8 | 95° C., ordinary pressure. |
| 13.5 ml. water+1.5 ml. 1 N—HCl | do | 95.5 | 2 | do | 293–294 | 97.8 | Ordinary. |
| Propanol-water (1:4) | do | 95 | 30 | Acetate | 168–172 | 82 | Do. |
| Isopropanol-water (1:5) | do | 110 | 25 | do | 168–172 | 85 | Do. |
| Water | do | 105 | <1 | Hydrochloride | 294–296 | 99 | 80–100° C., 70–80 atm. |

The isolation of the product after filtering off the catalyst is achieved in different ways, depending on the solvent used during the reduction.

(1) Water is removed by lyophilization, and the residue is purified by sublimation in vacuo at 50–70° C. α-amino-ε-caprolactam, as described by D. W. Adamson, J.C.S. 1943, p. 39, melts at 68–71° C.

(2) In case of acidic reaction media, the solvents are evaporated in vacuo, and the hydrochloride or acetate, respectively, of the α-amino-ε-caprolactam is recrystallized from alcohol or alcohol containing a small proportion of acetic acid, respectively. Addition of ether may improve the yield of crystalline precipitate. Pure α-amino-ε-caprolactam hydrochloride, as described by D. W. Adamson, J.C.S., 1943, p. 39, melts at 294–296° C. The acetate, when freshly prepared, melts at 176–178° C., after a change of its crystal structure at about 145° C.

Analysis of the acetate shows it to contain: C, 50.9; H, 8.63; N, 14.78 (theory: C, 51.02; H, 8.57; N, 14.89). In a high vacuum, the acetate undergoes sublimation at 140° C., without decomposition. Analysis of such a sample, M.P. 176–178° C., shows it to contain: C, 51.14; H, 8.72; N, 14.67.

(3) In case of neutral reaction media containing an organic solvent, the α-amino-ε-caprolactam is converted into the hydrochloride by addition of 1.5 equivalents of 1 M-hydrochloric acid or into the acetate by addition of an excess of glacial acetic acid. Subsequent evaporation of the solvent yields a residue which is treated further as described in the preceding paragraph.

(4) Free α-amino-ε-caprolactam may be prepared from the hydrochloride or the acetate in the following way:

1.64 g. (=0.01 mol.) of α-amino-ε-caprolactam hydrochloride (or 1.88 g.=0.01 mol. of the acetate, respectively) are dissolved in 2.8 ml. of water, and the resulting solution is treated with 9.75 ml. of 1.0 N-sodium hydroxide, then evaporated to dryness at 0° C. in vacuo. The residue heated under vacuum at 50–70° C. gives a white sublimate of pure α-amino-ε-caprolactam, M.P. 73–74° C. (yield: 97.6%), and leaves unsublimed sodium chloride (acetate, respectively). The unsublimed residue of sodium salt gives a neutral reaction indicating that all the α-amino-ε-caprolactam is removed by the sublimation process.

EXAMPLE 2

18.2 g. of α,α-dichloro-ε-caprolactam and 14.0 g. of hydroxylamine hydrochloride are dissolved in 120 ml. of a 10% solution of ammonia in methanol, then sealed in a tube, heated to 60° C. and shaken for 14 hours. At the end of this time the tube is cooled, the contents are removed and filtered to remove the precipitated ammonium chloride. 30 g. of Raney nickel and 12 ml. of water are added to the filtrate which is then poured into a hydrogenation autoclave. Hydrogen is led into the autoclave till the internal pressure is 70 to 80 atmospheres, the temperature is raised at the same time to 80–110° C. and the autoclave is shaken till uptake of hydrogen ceases. The autoclave is emptied, the Raney nickel is filtered off and a methanolic solution of sodium methylate is added to the filtrate until it is just alkaline. The solution is concentrated and distilled in vacuo. DL-α-amino-ε-caprolactam distills in the form of an oil which then crystallizes. B.P.$_{11\ mm.}$, 176° C. The DL-α-amino-ε-caprolactam is contaminated with about 10% caprolactam. The purification can be performed by adding an isopropanol solution of hydrogen chloride to a 10% solution of the impure product in isopropanol; the precipitated hydrochloride of the amine is filtered off under suction. Should the latter still contain caprolactam, which can be determined by paper chromatography of the hydrolysate, this hydrochloride can be completely purified by recrystallization from methanol.

The solution of α-oximino-ε-caprolactam necessary for the hydrogenation can, for example, also be prepared in the following manner:

18.2 g. of α,α-dichloro-ε-caprolactam, 14 g. of hydroxylamine hydrochloride and 120 ml. of abs. methanol are introduced in a reaction vessel provided with reflux cooler (supplied with a tube containing sodium lime), agitator and a gas inlet tube ending above the liquid surface. The contents of the vessel are heated to 60° C., and after everything has gone into solution, ammonia is passed through for 24 hours. The solution is cooled, and the precipitated ammonium chloride is filtered off under suction. 30 g. of Raney nickel and 12 ml. of water are added to the filtrate, and hydrogenation is effected as indicated above.

The solvent, methanol, may be replaced by a similar amount of some other alcoholic solvent, such as propanol or isopropanol. These alcohols are, however, poor solvents for mineral acid salts of hydroxylamine such as, for example, the hydrochloride and the sulfate. Therefore, the hydroxylamine salt should be finely powdered before use, and the addition of gaseous ammonia is started after raising the temperature to about 75° C. or 90° C., respectively, in the presence of isopropanol or propanol, respectively, regardless of incomplete solution of the hydroxylamine salt applied in the reaction. The precipitate obtained after cooling and filtering the reaction mixture occasionally contains, besides ammonium salts, some α-oximino-ε-caprolactam which may be isolated by extraction with moist ethyl acetate as indicated in Example 1. The mother liquor is diluted with an equal volume of water and hydrogenation is effected after addition of 10 g. of Raney nickel as indicated above.

What is claimed is:

As a new substance, α-oximino-ε-caprolactam.

No references cited.